Aug. 4, 1953
S. J. SMITH ET AL
2,647,395
DENSITY MEASURING DEVICE
Filed March 9, 1951
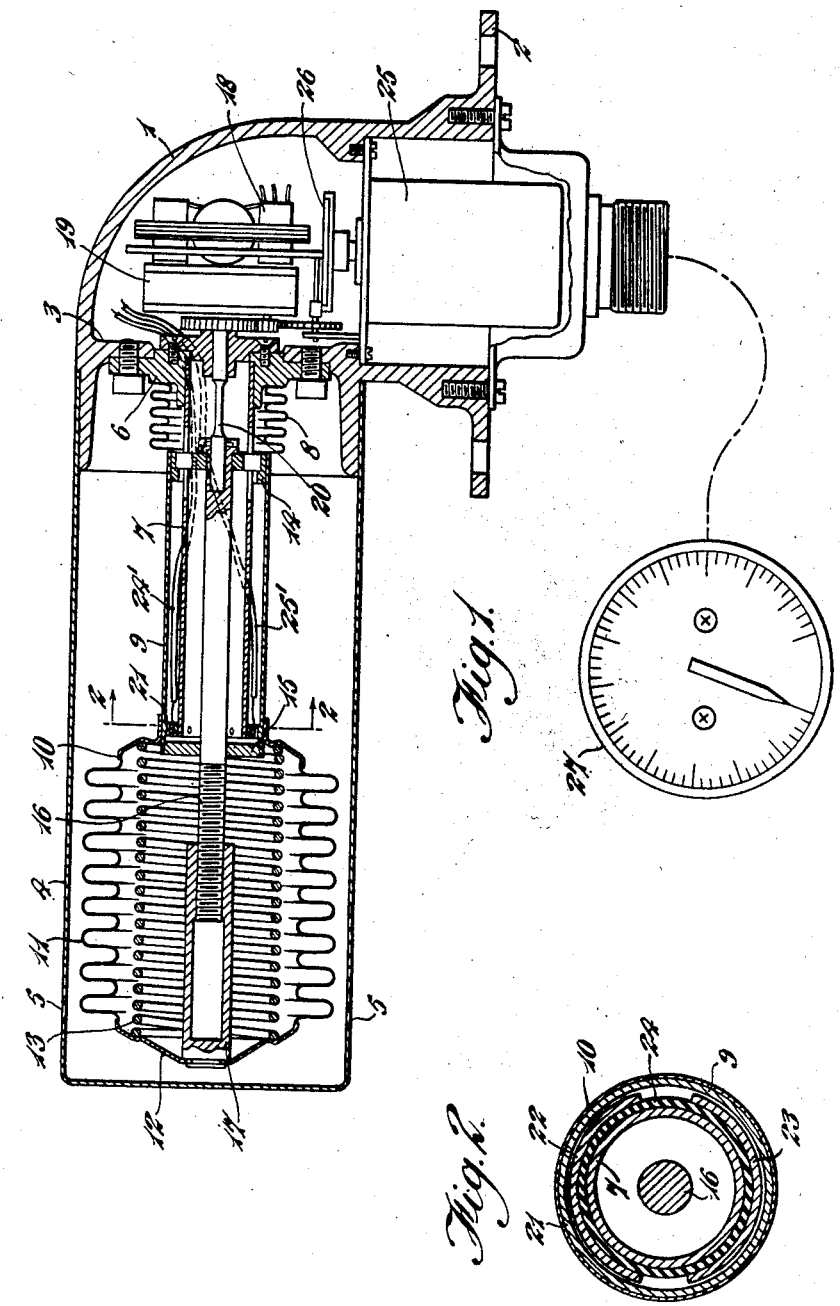
INVENTORS
S. J. Smith
& J. Weber, Jr.
By Watson, Cole, Grindle & Watson Patented Aug. 4, 1953

2,647,395

UNITED STATES PATENT OFFICE 2,647,395

DENSITY MEASURING DEVICE

Stanley James Smith and Theodore Weber, Jr., New York, N. Y.

Application March 9, 1951, Serial No. 214,716

5 Claims. (Cl. 73—33)

This invention relates to apparatus for indicating the density of a liquid and more particularly but not exclusively to apparatus for continuously measuring and providing remote indication of the density of the fuel in an aircraft fuel tank.

Measurement of liquid density is, in general, most conveniently carried out by means of an hydrometer. In the case of fuel in aircraft, however, where remote indication and insensitivity to acceleration and deceleration and also to attitude are required, such means is not utilizable.

The primary object of our invention is to provide a liquid density meter which is not appreciably affected by acceleration or deceleration or by changes in attitude and which is simple in construction and reliable in operation.

A further object of our invention is to provide a device for continuously measuring and indicating the density of a liquid.

The apparatus in accordance with our invention comprises a sealed, variable-volume buoyancy chamber immersible in the liquid whose density is to be measured and means for varying the volume of the buoyancy chamber in accordance with the density of the liquid whereby the "density" of the said buoyancy chamber is maintained equal or substantially equal to that of the liquid. If the volume of the buoyancy chamber is continuously adjusted so that under all conditions its "density" is identical with the density of the liquid in which it is immersed, there will be no forces acting upon the chamber even when the apparatus is subjected to acceleration or deceleration or to variation in attitude.

Preferably the buoyancy chamber comprises an expansible and contractible bellows and the volume of the bellows is adjusted in accordance with the density of the liquid by means of an electric motor which is caused to rotate in one or other direction when the density of the liquid rises above or falls below the "density" of the buoyancy chamber, and one form of apparatus in accordance with our invention embodying such an electro-mechanical self-balancing mechanism is shown in the accompanying drawing, in which Figure 1 is a central longitudinal sectional view of the apparatus, and Figure 2 is a section on the line 2—2 of Figure 1, looking in the direction of the arrows and drawn to an enlarged scale.

The apparatus shown in the drawing comprises an elbow-shaped housing 1 having at one end an outwardly-extending attaching flange 2 whereby the apparatus may be mounted, for example, in the bottom of the fuel tank of an aircraft. The housing 1 has adjacent its other end an inwardly-extending flange 3 and has secured to such end a cylindrical casing 4 which is closed except for opposed, small holes 5. Screwed to flange 3 is an annular mounting member 6 to which is rigidly secured at one end a cylindrical tube 7 that extends axially of the casing 4. Surrounding the inner end of tube 7 is a bellows member 8 which is secured at one end to the annular mounting member 6 and at its other end to one end of a tubular lever 9 co-axial with tube 7. The bellows 8 not only permits pivotal movement to the lever 9 but also seals the lever 9 to the annular mounting member 6.

Secured to the outer end of the lever arm 9 by means of a head member 10 is a bellows 11 forming a buoyancy chamber, the other end of the bellows being closed by a head 12. The bellows or buoyancy chamber 11 is thus located by the lever arm 9 which has as its pivot the small bellows 8 which provides a substantially frictionless pivot of negligible spring rate. A helical spring 13 housed within the bellows 11 and seated against the head 10 bears against the head 12 and urges the bellows 11 to its expanded condition, thus preventing any backlash.

Rotatable in bearings 14 and 15 secured within the lever arm 9 at the ends thereof is an axially extending rod 16 the outer end of which is threaded and is screwed into an internally-threaded sleeve 17 fixed at its outer end to head 12 of bellows 11. The rod 16 is adapted to be rotated in one or other direction by a small two-phase hysteresis-type motor 18, through a train of gears 19 and a flexible coupling 20, and, depending on the direction of rotation of motor 18, the bellows will be expanded or contracted when motor 18 rotates. Motor 18 is actuated by a differential contact arrangement comprising two pairs of contacts provided by a circular contact member 21 within the lever arm 9 adjacent the outer end thereof and integral therewith and by upper and lower approximately semi-circular contact members 22 and 23 which are secured to the stationary contact arm 7 at the outer end thereof, the contact members 22 and 23 being insulated from the contact arm 7 by an annular strip of insulating material 24. In the neutral position of the lever arm 9 the contact member 21 is spaced both from the upper contact member 22 and from the lower contact member 23, as shown in Figure 2, and both pairs of contacts are open. The contacts 22, 23 are included by leads 24', 25' in the motor circuit which also includes a source of current (not shown), which in the case of aircraft, may be single phase A. C. at 26 volts and 400 cycles.

The operation of the device is as follows. With the casing 4 immersed in the liquid the density of which is to be measured, the liquid will enter the casing through the relatively small holes 5 which will provide a degree of hydraulic damping that decreases the effects of any surge of or turbulence in the liquid. On increase in density of the liquid the buoyancy chamber 11 will rise in the liquid in casing 4 and the upper pair of contacts 21, 22 will be closed. Closure of the upper pair of contacts results in rotation of motor 18 in such a direction that the volume of the buoyancy chamber 11 is reduced and the "density" of the buoyancy chamber is again made equal to that of the liquid in which it is immersed with the result that contacts 21, 22 are opened. A reduction in the density of the liquid will cause the buoyancy chamber to sink and the lower pair of contacts 21, 23 to be closed. The motor 18 is then rotated in the opposite direction thus increasing the volume of the buoyancy chamber and making its "density" equal to that of the liquid, the buoyancy chamber rising in the casing 4 and opening contacts 21, 23. In practice the balanced condition is unstable in that no forces act upon the mechanism so that hunting around the balance point will occur. The amplitude of the instability is determined by the sensitivity, rate of response and damping of the syestem in accordance with normal characteristics of such systems and may be readily reduced to an acceptable value by suitable design. Variation of operating conditions at the null point will cause no error.

With the apparatus shown in the drawing, a change of buoyancy of 0.2 gram is realized for a one per cent change in density. This will move the lever arm 9 an amount sufficient to close one pair of contacts and open the other if the contact gap is of the order of 0.010 inch. The annular spring rate of the fulcrum bellows 8 plus that of the flexible coupling 20 should be 0.2 in. lb. per radian to satisfy this condition. Commercial bellows are available having flexibility of this order.

It is evident that the ideal conditions in which equilibrium is established when the bellows has a buoyancy of exactly zero will be realized only if the mounting means for the bellows exert no biasing force thereon. In actual practice this will never quite be realized and any bias thus introduced should be compensated for during calibration. The system will then not be altogether insensitive to acceleration and deceleration. The effect, however, will be of a second order and can easily be reduced to negligible proportions.

From the above description it will be clear that the position of the rod 16 and thus of the rotor of the motor 18 is in direct and linear function of the density of the liquid and the position of the rotor of the motor is utilized to give directly or indirectly an indication of the liquid density. In cases where a remote indication of density is required an Autosyn transmitter 25 may be actuated by the rotor of motor 18 through a chain of gears 26, as shown in the drawing and a remote indicator 27 of similar type connected with the transmitter 25 will provide an accurate indication of the density. Other electrically-operated means than an Autosyn transmitter and receiver may be used to give a remote indication of the liquid density as will be readily apparent to those skilled in the art. For example the rotor of motor 18 may actuate a potentiometer which in turn actuates a remote indicator.

The apparatus, instead of being mounted in the bottom of a fuel tank, for example, could form part of a fuel line or be mounted at some other desired location.

With the apparatus described change of attitude does not effect the operation within certain limits and merely affects the sensitivity to a second order degree. The substantially semi-circular form of the stationary contacts 22, 23 ensures satisfactory operation at all attitudes within a given range. It will be noticed that the pairs of contacts 21, 22 and 21, 23 are isolated from the liquid and that no amplifier or other intermediate device is required. The motor current required is low so that arcing and oxidation of the contacts is completely eliminated. Errors due to the thermal expansion of the float may be kept well within the permitted tolerance of plus or minus 2 per cent.

We claim:

1. Apparatus for continuously indicating the density of a liquid, comprising a tubular float arm pivoted at one end, an expansible and contractible bellows secured at one end to the other end of the float arm, an electric motor, an externally threaded member extending through the float arm and connected at one end with the motor to be rotated thereby, an internally threaded member secured at one end to the other end of the bellows and threadedly engaging at its other end the externally threaded member, a fixed member extending within the float arm, two pairs of co-operating contacts included in the motor circuit, one contact of each pair being carried by the float arm and the other contact of each pair being carried by the said fixed member, and means under the control of the motor for continuously indicating the density of the liquid.

2. Apparatus for continuously indicating the density of a liquid, comprising a variable-volume buoyancy chamber, means for yieldably mounting said chamber immersed in the liquid, a reversible electric motor, a differential contact device included in the motor circuit and adapted to effect rotation of the motor in one or other direction, operative connections between said contact device and said buoyancy chamber whereby said contact device is operated upon rising or falling movement of said buoyancy chamber, means actuated by the motor for increasing or decreasing the volume of the buoyancy chamber, and means controlled by the motor for continuously indicating the density of the liquid.

3. Apparatus for indicating the density of a liquid, comprising a sealed, variable-volume buoyancy chamber, means for yieldably mounting said chamber immersed in the liquid, means for varying the volume of the chamber, and means controlled by the rise and fall of said chamber for actuating said first mentioned means to maintain the "density" of said chamber substantially equal to that of the liquid, and an indicator controlled by said last named means for indicating the density of the liquid.

4. Apparatus for indicating the density of a liquid, comprising an expansible and contractible bellows and forming a buoyancy chamber, means for yieldably mounting said chamber immersed in the liquid, a reversible electric motor, a motor circuit including reversing contacts for said motor, connections between said contacts and said bellows, whereby the motor is caused to rotate in one or other direction on rise or fall of the bellows, means actuated by the motor for expanding and contracting the bellows, and an indicator connected to and actuated by the motor for indicating the density of the liquid.

5. Apparatus according to claim 4, and comprising a tubular float arm secured to one end of the said bellows, a pivotal mounting for said float arm comprising a second bellows secured to the other end of the float arm, and wherein the means actuated by the motor for expanding and contracting said first named bellows includes a member extending through the float arm and operatively connected between said second bellows and said motor.

STANLEY JAMES SMITH.
THEODORE WEBER, Jr.

References Cited in the file of this patent

UNITED STATES PATENTS

| Number | Name | Date |
|---|---|---|
| 1,546,702 | Bailey | July 21, 1925 |
| 2,282,069 | Linebarger | May 5, 1942 |
| 2,301,273 | Greene et al. | Nov. 10, 1942 |
| 2,530,981 | Mikina | Nov. 21, 1950 |

FOREIGN PATENTS

| Number | Country | Date |
|---|---|---|
| 229,452 | Switzerland | Feb. 1, 1944 |
| 938,365 | France | Apr. 5, 1948 |